May 9, 1944.　　　L. S. WILLIAMS　　　2,348,375
WEIGHING SCALE
Filed Aug. 5, 1942　　　3 Sheets-Sheet 1
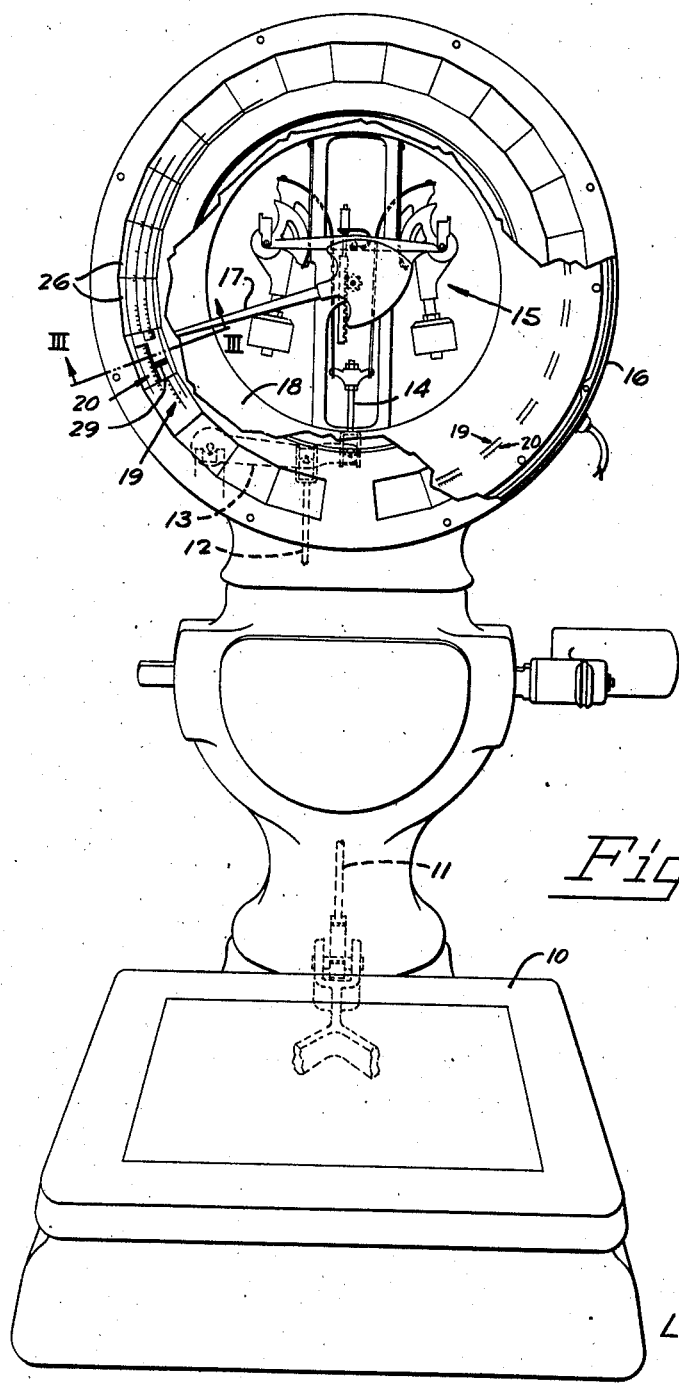
Fig. I
Lawrence S. Williams
INVENTOR
BY　Marshall and Marshall
ATTORNEYS

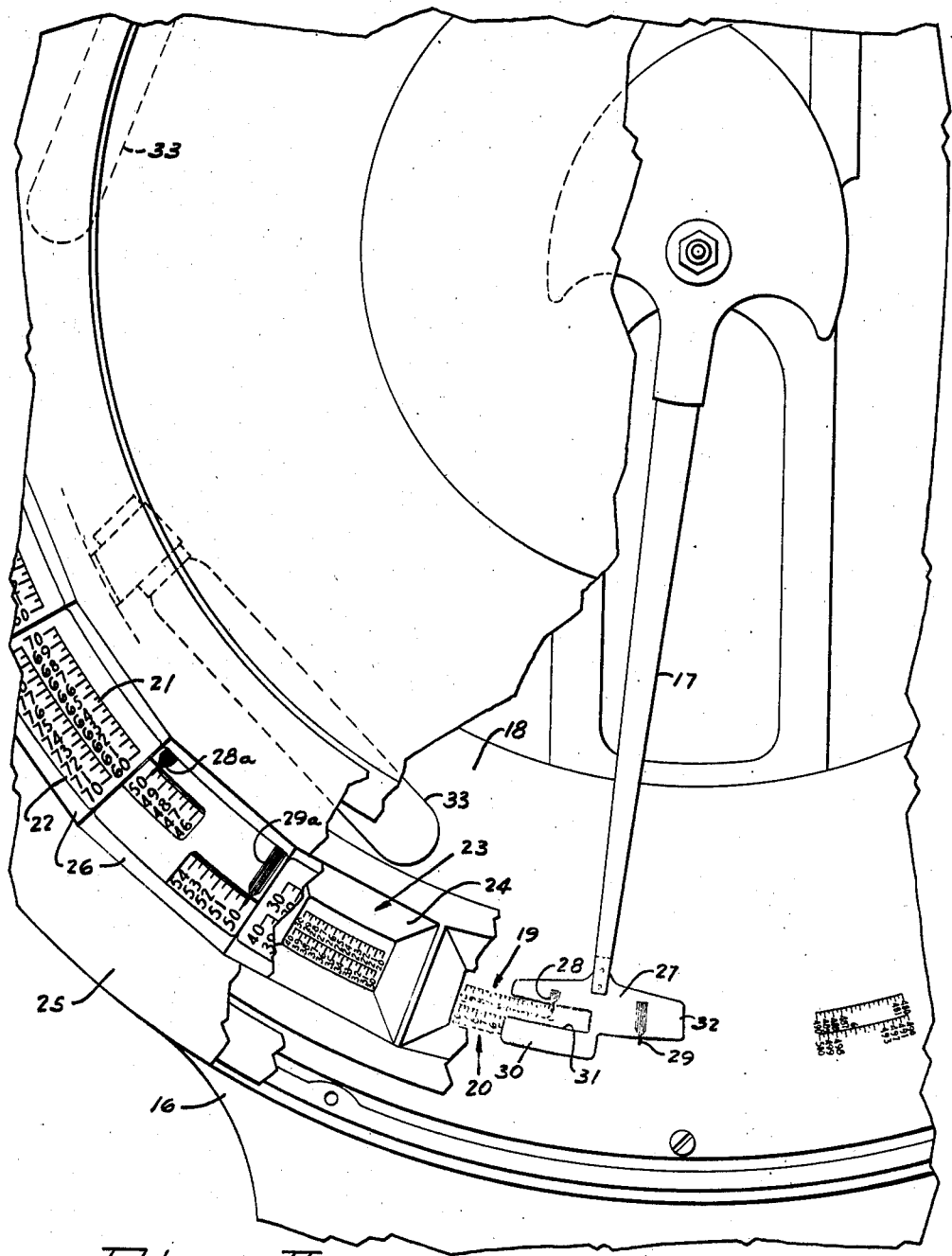
Fig. II
Lawrence S. Williams
INVENTOR

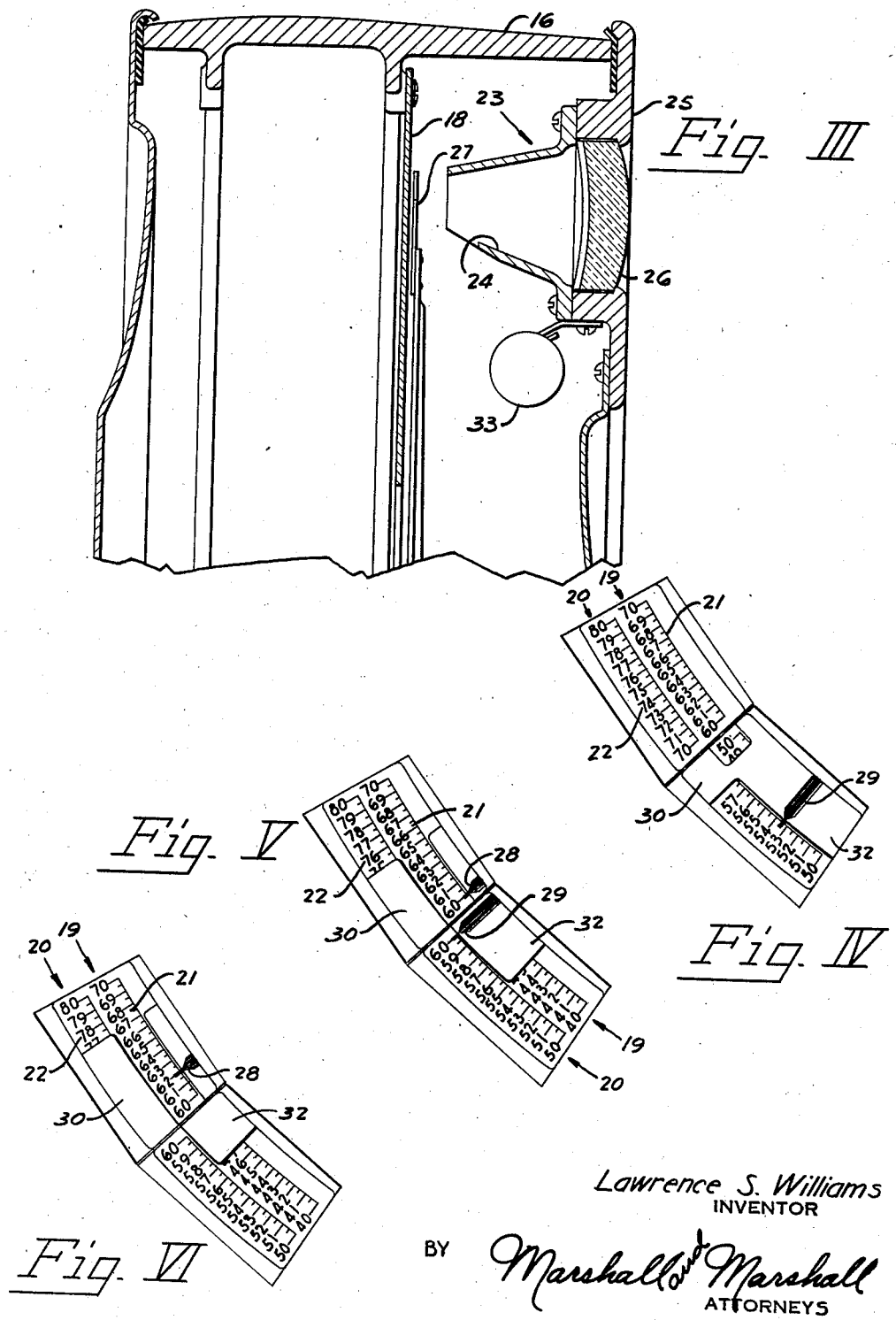

Patented May 9, 1944

2,348,375

UNITED STATES PATENT OFFICE 2,348,375

WEIGHING SCALE

Lawrence S. Williams, Toledo, Ohio, assignor to Toledo Scale Company, Toledo, Ohio, a corporation of New Jersey Application August 5, 1942, Serial No. 453,635

3 Claims. (Cl. 116—129)

This invention relates to weighing scales, and more particularly to means for providing a magnified indication of the indicia borne by the chart of a dial scale.

The number of indicia which can be provided on a dial scale is limited by the size of the dial of the scale which practicably can be constructed and by the distance over which an indicator in such a scale accurately can be swept by the scale mechanism.

It is an object of this invention to provide means whereby a double row of indicia can be printed on the chart of a dial scale and greatly magnified and accurately indicated, thereby affording apparently larger indicia and greater indicator travel.

It is another object of this invention to provide a magnifying lens system aranged with respect to the chart of a dial scale to afford a magnified indication.

It is still another object of this invention to provide a weighing scale indicator for use in cooperation with several rows of magnified indicia to indicate in only one of such rows of indicia at a time.

More specific objects and advantages are apparent from the description, in which reference is had to the accompanying drawings illustrating a preferred form of scale embodying the invention.

In the drawings:

Fig. I is a view in elevation of a weighing scale embodying the invention.

Fig. II is a greatly enlarged fragmentary view in elevation, certain parts being broken away, of indicating means embodying the invention.

Fig. III is an enlarged vertical sectional view, taken from the position indicated by the line III—III of Fig. I.

Figs. IV, V and VI are similar views of a section of the indicating means illustrated in Fig. II and showing the indicator in various positions.

These specific drawings and the specific description that follows merely disclose and illustrate the invention and are not intended to impose limitations upon the claims.

A load receiver 10 of a weighing scale is connected by means of pull rods 11 and 12, pendulum lever 13 and pull rod 14, to load counterbalancing mechanism 15 which is located in the interior of a dial housing 16.

An indicator arm 17 is operatively connected to the load counterbalancing mechanism 15 and adapted to be swept over an annular chart 18 (see also Fig. II) which is located within the interior of the dial housing 16. The chart 18 comprises two concentrically arranged annular series of indicia 19 and 20. The series of indicia 19 consists of a conventional series of indicia from which the groups of indicia comprising those from 10 to 20, 30 to 40, 50 to 60, 70 to 80, etc. have been deleted. The series of indicia 20 comprises those deleted indicia. Each of the groups of indicia in the series 20 is located radially adjacent the next lower group in the series 19. For convenience the terminal indicia of each of the groups are duplicated in the other series. Thus alternate groups of ten increments of weight each are located in different series of indicia and two successive groups of ten increments of weight each are located adjacent each other. For example, a group of indicia in the series 19, designated by the numeral 21 in Figs. II, IV, V and VI, covers weight values from slightly less than 60 to slightly more than 70, and a group of indicia, indicated by the numeral 22 in Figs. II, IV, V and VI, covers weight values from slightly less than 70 to slightly more than 80 and is located in the series of indicia 20.

Each pair of adjacent groups of weight indicia are spaced from the successive pair of groups of weight indicia, as can be seen in Figs. I and II. Over each of the pairs of groups of indicia there is located a lens cell 23 (see also Fig. III) which comprises a funnel-shaped screen 24 fastened on the interior of an annular frame 25 secured to the front of the housing 16 and a lens 26 mounted in front of the opening in the funnel-shaped screen 24. The walls of each of the screens 24 enclose the area occupied by that pair of indicia groups over which such screen is located and the magnification of each of the lenses 26 is such that the pair of groups of indicia is magnified to substantially fill the area delineated by the larger front end of the funnel-shaped screen 24 framing the lens.

When viewed through the lenses 26, the blank spaces between the groups of indicia are shaded by adjacent lenses and the two series of indicia 19 and 20 appear to be continuous, the alternate groups each of ten increments of weight being in different series and each pair of successive groups being adjacent.

The indicator arm 17 carries a dual indicating member 27 at its outermost end. The member 27 carries two index lines 28 and 29 which cooperate with the series of indicia 19 and 20 respectively. The member 27 also carries a mask 30 which is located above the area of the series of indicia 20 and has a length along the circumferential line of such indicia equal to slightly less than the circumferential length of one of the pairs of groups of indicia on the chart 18. The mask 30 is set off from the body of the member 20, leaving a slot 31 which overlies the area occupied by the series of indicia 19 and into which slot the index line 28 extends. The index line 29 is on a portion of the member 27 which forms a mask 32 over the area occupied by the series of indicia 19 circumferentially adjacent to the slot 31. The two index lines 28 and 29 are circumferentially spaced from each other a distance equal to the distance occupied by ten increments of weight as indicated by the indicia in the series 19 and 20.

When a load is placed upon the weighing scale, the indicator arm 17 is swung around over the chart 18 and the value of the load is read as shows in Figs. II, IV, V and VI. If the load is of an even tens value (see Fig. II), the index lines 28 and 29 are both located on the indicia marks corresponding to the tens value of the load in their respective series of indicia 19 and 20, as shown by the index lines indicated by the numerals 28a and 29a in Fig. II which show the indication of the scale for a load of fifty increments of weight. If the weight of the load is between the minimum and maximum of the indicia in the series 20 in one of the pairs of indicia groups (as shown in Fig. IV), the mask 32 covers that portion of the series of indicia 19 in such pair and the index line 29 indicates the weight on the series of indicia 20. The index line 28a in such circumstances is located in the space between the pair of groups of indicia including the value of the load and the next highest pair of groups and is hidden between the walls of the two funnel-shaped screens 24 comprising a part of the lens cells 26 over these two pairs of indicia groups.

If the value of the load on the scale is equal to the highest value shown in one section of the series of indicia 20 and the lowest value shown in the next highest section of the series of indicia 19 (as shown in Fig. V), the index lines 28 and 29 each point to the correct value, in this case sixty increments of weight, and the reverse of the situation shown in Fig. II exists; i. e., in Fig. II both index lines 28a and 29a are located within the confines of a single lens cell 23 and both are visible, and in Fig. V the index lines are located within the confines of successive lens cells and both are visible.

If the indicium showing the value of the load is included only in the series of indicia 19, the index line 28 alone is visible (Fig. VI) and the mask 30 covers the section of indicia 20 also appearing in the lens cell with the index line 28.

Thus, the only time that both of the index lines 28 and 29 are visible at once is when they both indicate the same weight. In all other instances, only one of the indicators is visible and the indicia in the series 19 or 20, with which the visible indicator does not cooperate, are covered by the masks 30 or 32. By dividing the indicia into the two series 19 and 20 and printing the series concentrically, with the groups radially adjacent each other and spaced circumferentially from each other, substantial magnification in the direction of indicator travel is made possible with a stationary lens system. This magnification of a conventional continuous series of indicia is impossible because those indicia behind the lens but not in its field of view are always hidden from the observer.

Illumination for both the indicia 19 and 20 and the indicator member 27, with its index lines 28 and 29, is afforded by several lamps 33 which are mounted within the housing 16 on the frame 25.

The embodiment of the invention that has been disclosed may be modified to meet various requirements.

Having described my invention, I claim:

1. In a weighing scale, in combination, a chart bearing weight indicia, said indicia being arranged in circumferentially spaced groups in two concentric series of groups, one of said series comprising a conventional series of indicia from which alternate groups of indicia have been deleted, the other of said series comprising the deleted groups, said groups being located in adjacent pairs, each of said pairs of groups consisting of successive indicia, a plurality of lens cells disposed above said pairs of groups, the inner ends of the walls of said cells hiding the space between said groups from view, a plurality of lenses, one of said lenses being mounted in the outer end of each of said cells, and an indicator having two index lines, one of said index lines being associated with each of said series of groups.

2. Indicating means for an instrument comprising, in combination, a chart bearing indicia, said indicia being arranged in two concentric series of circumferentially spaced groups of indicia, one of said series comprising a conventional series of indicia from which alternate groups have been deleted, the other series comprising the deleted indicia, each group of indicia comprising a selected number of consecutive indicia, each series comprising consecutively alternate groups of indicia, each group of indicia in one of said series being radially adjacent to one of said groups of indicia in the other of said series, a hollow lens cell arranged over each pair of radially adjacent groups of indicia, the inner end of each of said cells delineating the area on said chart occupied by one of such pairs of groups, a plurality of lenses, one lens being located in the outer end of each of said lens cells, for magnifying the indicia in such pair to an apparent size sufficient to present two concentric continuous series of indicia to the eye of an observer, an indicator having an index line for cooperation with each of said series of indicia and a mask associated with each of said index lines for hiding a portion of that one of said series not cooperated with by said index line.

3. Indicating means for a condition responsive device comprising, in combination, a chart bearing condition magnitude indicia, said indicia being divided into a plurality of groups of successive indicia, successive groups of said indicia being combined into sets by transferring one of the groups of each set to a position radially adjacent the other, a hollow lens cell arranged over each of said sets of groups of indicia, the inner end of each cell delineating the portion of said chart occupied by said set of groups of indicia, a lens mounted in each of said lens cells to magnify in both directions said portion of said chart delineated by said lens cell, and an indicator having index lines to cooperate with said groups of indicia, said index lines being spaced in the direction of indicator travel, whereby the reading point of index on indicia progresses with indicator travel from group to group within each set, and from the last group of one set to the first group of the next set.

LAWRENCE S. WILLIAMS.